P. CROSLEY, Jr.
LAMP HEATER.
APPLICATION FILED AUG. 26, 1916.
1,271,439.
Patented July 2, 1918.
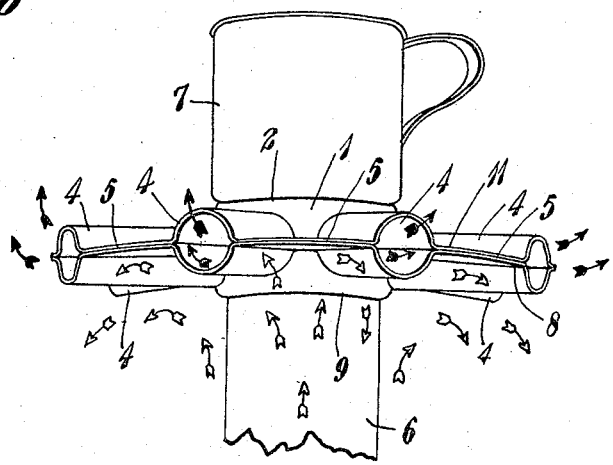
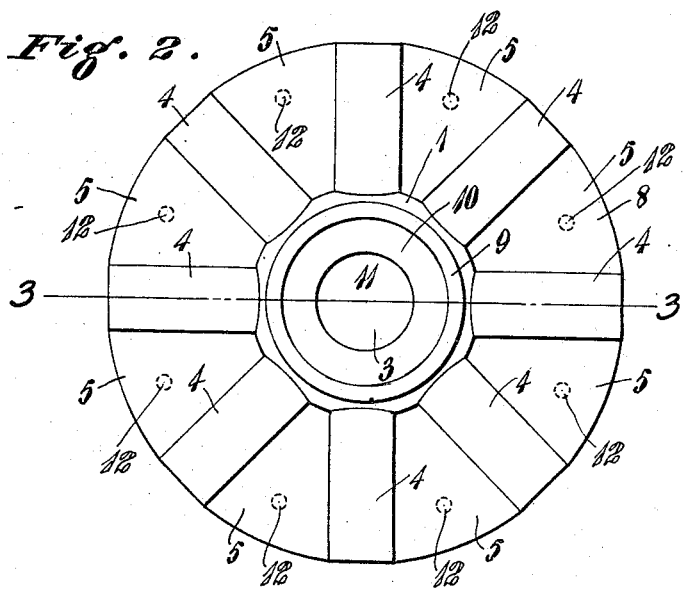
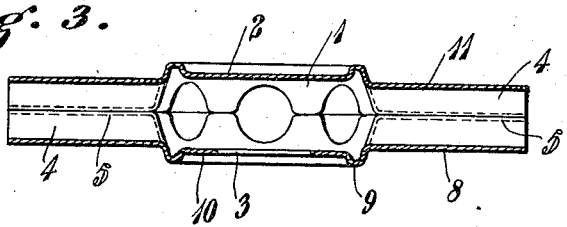
Witnesses:
Clarence Perdew
Edith Loichinger
Inventor
Powel Crosley Jr.
By James N. Ramsey
Attorney.

UNITED STATES PATENT OFFICE.

POWEL CROSLEY, JR., OF CINCINNATI, OHIO.

LAMP-HEATER.

1,271,439.

Specification of Letters Patent.   Patented July 2, 1918.

Application filed August 26, 1916.   Serial No. 117,045.

*To all whom it may concern:*

Be it known that I, POWEL CROSLEY, Jr., a citizen of the United States, and a resident of Cincinnati, in the county of Hamilton and State of Ohio, have invented certain new and useful Improvements in Lamp-Heaters, of which the following is a specification.

My invention relates to heating attachments for gas or oil lamps, for obtaining an ample distribution of the heat from the lamp in the lower part of the room; and the object is to provide an extremely simple construction and to improve the operation of devices of this character.

My invention consists in the combination of parts and in the details of construction and arrangement of parts as will hereinafter be more fully described and claimed.

In the drawing:

Figure 1 is a perspective view showing how the device is used on the top of the chimney of a lamp, whether it be a gas, oil or other lamp, and also showing how the device may heat the contents of a small vessel;

Fig. 2 is a bottom plan view of the device; and

Fig. 3 is a vertical cross section on a plane corresponding to the line 3—3 of Fig. 2.

As I prefer to construct my invention there is a central receiving and distributing chamber 1 with a closed top 2 and a bottom having an opening 3. A plurality of tubes 4 lead from the sides of the chamber 1 radially outward in a substantially horizontal plane at intervals therearound. Continuous between the adjacent tubes 4 from the walls of the chamber 1 out to the ends of the tubes are webs 5.

When the device has the bottom of its chamber 1 resting on the upper rim of the lamp chimney 6, there is direct communication between the interior of the chimney and the interior of the chamber 1; so that the superheated air from the lamp 6 passes directly into the chamber 1 and is distributed to the radial tubes 4, through which it passes horizontally outward, heating these tubes and the adjacent webs 5. This device, like other devices of this character, thus heats the air of the room on account of the air coming into contact with the exteriors of the tubes 4 and the webs 5; especially the air coming in contact with the lower sides of these. But of course this air does not become as hot as the air passing through the tubes. The result is that the superheated air, where it emerges from the ends of the tubes 4, will pass nearly directly outward along with the less heated air, as it passes away from the sides of the tubes and webs, especially that passing from under the tubes and webs, and all of the heated air will have a more nearly horizontal direction. Thus, the heated air is more thoroughly distributed in the lower regions of the room, where it is needed.

Another advantage of the horizontal direction of the tubes 4 over any decidedly downward direction of the tubes is the better draft given to the lamp.

As shown in Fig. 1, the flat top 2 may receive a vessel such as the cup 7, to be used in heating small quantities of liquid.

Not only have I constructed my device to meet the above requirements, but I have provided this construction in a very simple form. The entire device consists of only two plates of metal pressed to such shape that they form, respectively, the upper and lower half of the device. The lower plate 8 has the cupped center to form the bottom of the chamber 1, with channels diverging therefrom to form the bottoms of the tubes 4, and these channels being connected by plane parts. The central part of the bottom of the cupped center is pressed upward, so that a downwardly extended bead 9 is formed around the edge. This prevents the device from sliding off the lamp chimney, and the opening 3 is of a diameter somewhat less than that of the central part inside the bead, so as to leave an annular surface 10 of some radial width, so that the device may fit chimneys of different diameters.

The upper plate 11 is formed like the lower plate 8 in every way, except that the center is not provided with an opening. Thus, both plates 8 and 11 may be cut out and formed by the same punches and dies. These two plates thus formed, are inversely assembled concentric with each other, with the channels and plane parts of each plate meeting the channels and plane parts, respectively, of the other plate. so that the channels form the tubes 4 and the intimately contacting plane parts form the webs 5. The plates are fastened together within the limits of these plane parts or webs. They may be riveted, but I prefer to spot-weld them, and it is this kind of fastening that the dotted circles 12 in Fig. 2 represent.

From the foregoing it will be seen that I have provided a device that is extremely simple, inexpensive in first cost; not liable to get out of order in use; adapted to permit an efficient operation of the lamp for lighting purposes on account of the free draft afforded through the substantially horizontal passages; and adapted to produce ample heating effect under moderate conditions without objectionably contaminating the air thus heated.

Having fully described my invention, what I claim as new and desire to secure by Letters Patent is:

As a new and improved article of manufacture, a lamp heater comprising two substantially circular plates of metal, each formed with a cupped center and channels radiating from the center, with continuous substantially plane parts between the channels and extending from the outside of the cupped center entirely out to the ends of the channels, said plates being substantially identical except that one of them has an opening in its cupped center, and said plates being inversely assembled concentric to each other, whereby the cupped centers form a distinct central receiving and distributing chamber, and with the channels of each plate meeting the channels of the other plate, and said plane parts of the respective plates being secured against each other, whereby distinct substantially tubular passages are formed, radiating from said receiving and distributing chamber.

POWEL CROSLEY, Jr.

Witnesses:
CLARENCE PERDEW,
JAMES N. RAMSEY.

Copies of this patent may be obtained for five cents each, by addressing the "Commissioner of Patents, Washington, D. C."